3,582,427
POLYOLEFIN-METAL LAMINATES
Robert Bacskai, Berkeley, Calif., assignor to
Chevron Research Company
No Drawing. Filed June 21, 1965, Ser. No. 465,723
Int. Cl. B32b *31/12;* C09j *3/14*
U.S. Cl. 156—283                                3 Claims

ABSTRACT OF THE DISCLOSURE

Completely nonpolar polymeric material such as polypropylene noted for inertness and poor adhesion is satisfactorily bonded to metal by applying a solid, particulate, thermoplastic polyacrylic acid to a bonding surface and joining with heat and pressure.

---

This invention relates to novel structures of metal and polyolefin and to their preparation. More particularly, this invention relates to novel polyolefin-metal laminates and their preparation.

Presently, most of the materials encountered in construction and engineering are homogeneous; that is they consist of a uniform material over their entire cross section. With the exception of concrete, nonhomogeneous materials have not found wide use in these fields. Lately, however, much attention has been centered upon developing new construction materials which could be used as replacements for some of the commonly used materials, such as steel, magnesium and aluminum. One focus of attention has been upon nonhomogeneous materials, principally laminates.

Laminates are feasible replacements for homogeneous construction materials in that the strength characteristics of a material need not be uniform in order that the material be usable for normal construction purposes. The reason for this is that upon loading a material the maximum bending stresses occur at the periphery of the material and decrease to zero within the material. Therefore, lower strength substances may be used as substrates in combination with high strength "skin" materials to provide excellent construction materials.

A promising group of laminates are those comprising polyolefin substrates and metal skins or laminae. These particular laminates combine the essential high-strength properties of metals with the light weight, low cost advantages of polyolefins. Presently, polyolefin-metal laminates are usually prepared by merely molding polyolefin substrates between sheets of clean sand-blasted metals with heat and pressure. See Modern Plastics, 119 (1964). However, the unification attained between the polyolefin and metal in this manner is not strong enough to enable the laminate to be extensively deep drawn without being delaminated. Therefore, the possibilities of forming these laminates into finished products, such as boat hulls and automotive body parts by die casting is severely limited.

It has now been found that polyolefin members may be strongly united to metal members by applying to the bonding surface of the polyolefin member a solid thermoplastic poly-α,β-unsaturated monocarboxylic acid or a copolymer of a polymerizable α,β-unsaturated monocarboxylic acid and a vinyl hydrocarbon monomer, the copolymer having an acid number of at least 2.5, and joining said members together by applying heat and pressure.

In carrying the present invention into effect, the surface of the metal member which may be aluminum, steel, magnesium or other metal or alloy is first carefully cleaned to remove grease, dirt and other organic residues. Cleaning may be accomplished by any appropriate convenient means, such as, for example, scrubbing or wiping with solvents such as acetone. Although it is not essential, better unification of the metal and polyolefin is obtained if the cleaned surface is sand or grit blasted. Know methods for sand and grit blasting may be used. After the blasting, it is preferable to remove residual sand and metal particles from the surface. Suitable means such as wiping, scrubbing or boiling with appropriate solvents may be used to remove these particles. Further treatment such as etching may also be used to enhance the unification of the metal to the polyolefin.

The polyolefin member or substrate may be of any polyolefin homopolymer or copolymer which is appropriate for molding into stable solid forms. Examples of polyolefins which may be used in this invention are polyethylene, polypropylene, poly-4-methyl-1-pentene, poly-3-methyl-1-pentene, poly-3-methyl-1-butene, polyvinylcyclohexane and copolymers thereof, e.g., ethylenepropylene, both random and block type. Polypropylene is particularly desirable because of its relatively high strength and low weight.

To the interface of the polyolefin and metal, usually directly to the polyolefin member, is applied a solid, thermoplastic derivative of a polymerizable α,β-unsaturated monocarboxylic acid selected from the group consisting of poly-α,β-unsaturated monocarboxylic acids and graft copolymers of a polymerizable α,β-unsaturated monocarboxylic acid and a vinyl hydrocarbon monomer, said copolymer having an acid number of at least 2.5. Usually, the copolymer will have an acid number in the range of about 2.5–700.

The polymerizable α,β-unsaturated monocarboxylic acids which are included in this invention as precursors to the polyacids or graft copolymers of this invention may be represented by the formula

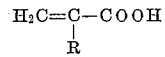

wherein R is hydrogen or a methyl group, i.e., acrylic and methacrylic acid. Acrylic acid is preferred.

Minor amounts of monomers such as styrene, vinylidene chloride, vinyl chloride, acrylonitrile and other polymerizable monomers having an activating group may be incorporated into the poly-α,β-unsaturated monocarboxylic acids derived from the above-described acid monomers without impairing their use in this invention.

The vinyl monomers which are intended for use in the graft copolymers of this invention have the structural formula:

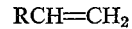

wherein R is hydrogen, straight-chain alkyl of from 1 to 2 carbons and branched-chain alkyl of from 1 to 5 carbons. Preferably, R is either hydrogen or methyl; that is, ethylene and propylene are the preferred vinyl monomers.

Other vinyl monomers represented by the above formula are 1-butene, 3-methyl-1-pentene, 4-methyl-1-pentene, 5-methyl-1-hexene, 3-methyl-1-butene, etc.

Illustrative of the thermoplastic polymeric derivatives suitable for use in this invention are polyacrylic acid, polymethacrylic acid, polypropylene-polyacrylic acid graft copolymers, polyethylene-polymethacrylic acid graft copolymers, poly - 4-methyl-1-pentene-polyacrylic acid graft copolymers, poly-3-methyl-1-butene-polymethacrylic acid graft copolymers, poly-5-methyl-1-hexene-polyacrylic acid graft copolymers, etc.

The thermoplastic polymeric derivative may be applied to the polyolefin member in particulate or powder form, for example, by sprinkling or dusting, or as a paste by spreading. When a paste is used, the polymeric material is uniformly admixed with a suitable volatile vehicle, such as water or acetone. After the paste is applied, sufficient time for drying must be allowed. The particulate or powder form is preferred for its ease and convenience in application.

In applying the polymeric material to the polyolefin member it is intended that the material be applied as a uniform, thin layer to the bonding surface of the member. The amount of thermoplastic derivative needed will, therefore, depend upon the surface area to be covered. Usually, about 0.05 to 1.0 gram material per square inch of bonding surface will be sufficient to obtain good bondage; more usually about 0.2 to 0.5 gram per square inch will be applied. When the copolymers of this invention are used, the amount required will depend on the acid number of the copolymers. If the copolymers has a high acid number, less will be needed to obtain good bonding. Correlatively, copolymers having low acid numbers will be used in greater quantity.

If necessary, the derivative may be mixed with pure polyolefin powder to increase its bulk and facilitate uniformity in its application to the metal-polyolefin member interface. Polypropylene or polyethylene powder will generally be used for this purpose.

The metal member and the polyolefin member to which the polymeric derivatives has been applied are joined under heat and pressure. When the desired end product is a laminate, both the metal and polyolefin member are in sheet form. In preparing a laminate, a sheet of polyolefin of desired thickness whose bonding surfaces have been covered with the polymeric material is assembled between metal sheets. The assembly is inserted into a press which is preheated to temperatures which are sufficient to melt the polyolefin sheet. Temperatures from about 400 to 600° F. will usually be employed. Heat is maintained for about a 1 to 10 minute cycle or until the polyolefin sheet has softened and melted. This cycle may vary within wide limits depending on the bonding temperatures and melt index of the polyolefin sheet. At temperatures near the melting point of the sheet longer times will be necessary; whereas, at higher temperatures shorter periods may be used. During the heating, pressure is applied to the assembly and excess polyolefin is squeezed out to reduce the laminates to the desired thickness. The press is then allowed to cool until the polyolefin sheet has solidified. To facilitate the cooling step, the hot assembly may be transferred to a cold press for cooling. Pressures in both the hot and cold press will generally be between about 25 to 5000 p.s.i. More usually, 100 to 1000 p.s.i. will be employed.

The novel polyolefin-metal laminates prepared in the above manner may comprise either a single sheet of polyolefin and a single sheet of metal or multi-sheets of either type member. In either case, the metal-polyolefin interface(s) will be covered with the thermoplastic polymeric derivative described heretofore. Usually, laminates will have a sandwich-like appearance; the polyolefin sheets being interposed between the metal sheets.

The following examples illustrate rather than limit the process and structures of the invention.

EXAMPLE 1

A powdery graft copolymer of polypropylene and 12.65 weight percent ethyl acrylate was prepared according to the method described in copending application Ser. No. 352,372. This graft copolymer had a melt flow rate of 5.4 (5,100 gms. 230° F.). This copolymer was hydrolyzed yielding a powdery material having an acid number of 5.6, a saponification number of 40 and a sulfate ash of 1.56%.

Two aluminum plates, 4 inches by 4.5 inches and 0.062 inch thick, were treated as follows: (a) wiped with paper tissue soaked in acetone; (b) sand blasted on one side; (c) immersed for 10 minutes in boiling trichloroethylene; (d) immersed for 10 minutes in an etching solution (60 gms. $Na_2Cr_2O_7 \cdot 2H_2O$, 300 ml. concentrated $H_2SO_4$, and 2 l. of water) at 70° C.; (e) rinsed with water; and (f) dried in air.

A ¼ inch thick molded polypropylene sheet was cut to the same 4 inch by 4.5 inch size as the aluminum plates. To each of the 4 x 4.5 inch surfaces were uniformly applied 1 gram of the hydrolyzed graft copolymer. The polypropylene sheet was then placed between the two sandblasted sides of the treated aluminum plates. This "sandwich" assembly was then placed in a press and molded at 260° C. and 5,000 pounds pressure for 5 minutes. The resulting laminate was then allowed to cool in a press at 5,000 p.s.i.

EXAMPLE 2

The hydrolyzed graft copolymer described in Example 1 was used to prepare an aluminum-polypropylene laminate in the manner also described in Example 1 except that 0.2 gram of the copolymer mixed with 4.8 grams of pure polypropylene powder (melt flow rate 3.5 at 2160 gms., 230° C.) were applied to each of the 4 x 4.5 surfaces.

EXAMPLE 3

A graft copolymer of polypropylene and ethylacrylate was prepared as described in Example 1. This copolymer was hydrolyzed to give a powdery copolymer having an acid number of 2.9 and a saponification number of 43.

This copolymer was used in the preparation of an aluminum-polypropylene laminate exactly as described in Example 1, except that 5 grams of copolymer were applied to each 4 x 4.5 inch surface.

EXAMPLE 4

An aluminum-polypropylene laminate was prepared as described in Example 1 except that 1 gram of finely powdered polyacrylic acid having a molecular weight of about $10^5$ and an acid number of 780 mixed with 4 grams of polypropylene powder (MFR 3.5 at 2160 gms., 230° C.) were applied to each 4 x 4.5 inch surface instead of the graft copolymer.

EXAMPLE 5

The preparation of an aluminum-polypropylene laminate was conducted exactly as described in Example 1 except that 1 gm. of polyacrylic acid was applied to each 4 x 4.5 inch surface instead of the graft copolymer.

EXAMPLE 6

A paste was prepared by dissolving 1 gm. of polyacrylic acid in 25 gms. of water and then mixing with 9 grams of polypropylene powder. One half of this paste was applied to the treated surfaces of aluminum plates prepared and sized as described in Example 1 and allowed to dry for 16 hours. A laminate was prepared by placing the dried-paste sides of the aluminum plates against a similarly sized ¼ inch thick polypropylene sheet followed by heat and pressure molding as in Example 1.

EXAMPLE 7

A laminate was prepared according to the process described in Example 1 in every material respect except that two 0.058 inch thick cold-rolled steel plates were used in place of aluminum.

EXAMPLE 8

A laminate was prepared according to the manner described in Example 1 except that a ¼ inch thick sheet of polyethylene was used in place of polypropylene and 1 gm. of polyacrylic acid was applied to each interface in place of the graft copolymer previously used.

The laminates of Examples 1–8 and laminates made with aluminum and polypropylene, aluminum and polyethylene and steel and polypropylene in the same manner described in Example 1 but without any polymeric material applied at the polyolefin-metal interfaces were each tested for shear and flexural properties. In these tests, each laminate was sawed into 0.5 inch wide strips which were tested for shear strength by ASTM D 1002–53T and for flexural strength by ASTM D 790–58T. The results of these tests are reported in Table I.

As will be evident to those skilled in the art, various modifications on this process can be made or followed, in the light of the foregoing disclosure and discussion, without departing from the spirit or scope of the disclosure or from the scope of the following claims.

I claim:

1. A process for joining a metal member to a solid polypropylene member which consists essentially of applying to a bonding surface of a solid polypropylene member a solid particulate thermoplastic poly-$\alpha,\beta$-unsaturated monocarboxylic acid selected from the group consisting of polyacrylic acid and polymethacrylic acid and joining said polypropylene member to said metal member with heating and pressure.

2. The process according to claim 1 wherein said poly-$\alpha,\beta$-unsaturated monocarboxylic acid is polyacrylic acid.

3. The process according to claim 1 wherein said poly-$\alpha,\beta$-unsaturated monocarboxylic acid is polymethacrylic acid.

TABLE I

| Laminate | Peel strength, lb./inch of width [1] | Shear strength, p.s.i. | Flexural strength, p.s.i. | Flexural modulus, p.s.i. | Flexed depth of specimen before delamination, percent |
|---|---|---|---|---|---|
| Aluminum-polypropylene without material | 3.6 | 67.2 | 21,000 | 714,300 | 20 |
| Aluminum-polyethylene without material | 10.1 | 70.9 | ---------- | 1,117,000 | 15 |
| Cold-rolled steel-polypropylene without material | ---------- | 41.3 | ---------- | 1,250,000 | 1 |
| Example 1 | ---------- | 252 | 36,000 | 1,052,000 | 200 |
| Example 2 | ---------- | 90 | 39,000 | ---------- | 100 |
| Example 3 | 48.2 | 246 | 30,000 | 666,700 | 94 |
| Example 4 | ---------- | 129 | 35,000 | 875,000 | 200 |
| Example 5 | ---------- | 190 | 29,000 | 1,034,000 | 30–60 |
| Example 6 | ---------- | 114 | 33,000 | 1,000,000 | 45–65 |
| Example 7 | ---------- | 104 | 30,200 | 1,180,000 | 97 |
| Example 8 | ---------- | 173 | ---------- | 1,130,000 | 70–120 |

[1] All laminates used had 0.012 inch thick Al sheets. Test according to ASTM D 903–49.

References Cited

UNITED STATES PATENTS

| | | | |
|---|---|---|---|
| 2,890,147 | 6/1959 | Pearson et al. | 156—283 |
| 2,995,482 | 8/1961 | Boyce et al. | 156—283 |
| 3,340,091 | 9/1967 | Zweig | 117—138.8E |
| 2,902,390 | 9/1959 | Bell | 117—132C |
| 2,970,129 | 1/1961 | Rugg et al. | 117—145 |
| 3,161,519 | 12/1964 | Alsup | 117—138.8E |
| 3,216,885 | 11/1965 | Schaufelberger | 161—97 |
| 2,728,703 | 12/1955 | Kiernan et al. | 161—216 |
| 3,211,808 | 10/1965 | Young et al. | 260—878 |
| 3,270,090 | 8/1966 | Nowak | 260—878 |
| 3,347,419 | 10/1967 | Brandt et al. | 161—216 |

FOREIGN PATENTS

| | | |
|---|---|---|
| 450,455 | 7/1936 | Great Britain. |
| 876,535 | 9/1961 | Great Britain 260—878 |

ROBERT F. BURNETT, Primary Examiner

R. J. ROCHE, Assistant Examiner

U.S. Cl. X.R.

156—327; 117—138.8, 161; 161—216